US011196648B2

(12) United States Patent
Subramani et al.

(10) Patent No.: US 11,196,648 B2
(45) Date of Patent: *Dec. 7, 2021

(54) DETECTING AND MEASURING MICROBURSTS IN A NETWORKING DEVICE

(71) Applicant: Cisco Technology, Inc., San Jose, CA (US)

(72) Inventors: Krishnan Subramani, San Jose, CA (US); Vinod Mitulal, San Jose, CA (US); Kinjal Shah, San Jose, CA (US); Georges Akis, Los Altos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,407

(22) Filed: Jul. 17, 2019

(65) Prior Publication Data

US 2019/0342193 A1  Nov. 7, 2019

Related U.S. Application Data

(63) Continuation of application No. 15/222,839, filed on Jul. 28, 2016, now Pat. No. 10,374,912.

(51) Int. Cl.
*H04L 12/26* (2006.01)
*H04L 29/08* (2006.01)
(Continued)

(52) U.S. Cl.
CPC .......... *H04L 43/04* (2013.01); *H04L 43/067* (2013.01); *H04L 43/0817* (2013.01);
(Continued)

(58) Field of Classification Search
CPC ....... H04L 43/04; H04L 47/30; H04L 43/067; H04L 43/0817; H04L 43/16; H04L 41/5096; H04L 49/90; H04L 47/62
See application file for complete search history.

(56) References Cited

U.S. PATENT DOCUMENTS 8,212,323 B2  7/2012  Lee et al.
8,213,323 B1 * 7/2012  Papagiannaki ......... H04L 43/16
370/252

(Continued)

*Primary Examiner* — Nicholas R Taylor
*Assistant Examiner* — Sanjoy Roy
(74) *Attorney, Agent, or Firm* — Polsinelli PC

(57) ABSTRACT

Systems, methods, and computer-readable storage media for monitoring queue occupancy in a network buffer, detecting microbursts, and analyzing the same. An ASIC device can monitor a queue occupancy value of a network buffer, detect when the queue occupancy value exceeds a first predetermined threshold queue occupancy, create a record with a time that the queue occupancy value exceeds the first predetermined threshold queue occupancy, a queue occupancy value at the time that the queue occupancy value exceeds the first predetermined threshold queue occupancy, detect when the queue occupancy value falls below a second predetermined threshold queue occupancy, and determine a maximum queue occupancy value between the time that the queue occupancy value exceeded the first predetermined threshold queue occupancy and a time that the queue occupancy value falls below the second predetermined threshold queue occupancy, and add to the record the maximum queue occupancy value, a time of the maximum queue occupancy value, the time that the queue that the queue occupancy value falls below the second predetermined threshold queue occupancy and the queue occupancy value at the time that the queue occupancy value falls below the second predetermined threshold queue occupancy.

20 Claims, 9 Drawing Sheets

(51) Int. Cl.
  *H04L 12/863*  (2013.01)
  *H04L 12/835*  (2013.01)
  H04L 12/861  (2013.01)
  H04L 12/24  (2006.01)

(52) U.S. Cl.
  CPC .............. *H04L 43/16* (2013.01); *H04L 47/30* (2013.01); *H04L 41/5096* (2013.01); *H04L 47/62* (2013.01); *H04L 49/90* (2013.01)

(56) References Cited

U.S. PATENT DOCUMENTS

| | | | |
|---|---|---|---|
| 9,154,569 B1* | 10/2015 | Dropps | H04L 47/10 |
| 2006/0114912 A1 | 6/2006 | Kwan et al. | |
| 2008/0101228 A1 | 5/2008 | Rodriguez et al. | |
| 2008/0225705 A1* | 9/2008 | Janarthanan | H04L 43/16 |
| | | | 370/230 |
| 2009/0220238 A1* | 9/2009 | Wang | H04L 47/10 |
| | | | 398/79 |
| 2011/0176418 A1 | 7/2011 | Gershinksy et al. | |
| 2014/0078903 A1* | 3/2014 | Edsall | H04L 47/29 |
| | | | 370/235 |
| 2014/0269378 A1* | 9/2014 | Holbrook | H01L 25/0657 |
| | | | 370/252 |
| 2017/0359266 A1* | 12/2017 | Gusat | H04L 43/0888 |

\* cited by examiner the disclosure will become more fully apparent from the following description and appended claims, or can be learned by the practice of the principles set forth herein.

DETECTING AND MEASURING MICROBURSTS IN A NETWORKING DEVICE

CROSS-REFERENCE TO RELATED APPLICATION

The instant application is a Continuation of, and claims priority to, U.S. patent application Ser. No. 15/222,839 entitled DETECTING AND MEASURING MICROBURSTS IN A NETWORKING DEVICE filed Jul. 28, 2016, the contents of which are herein incorporated by reference in its entirety.

TECHNICAL FIELD

The present technology pertains to monitoring queue traffic and, more particularly, to detecting and measuring microbursts.

BACKGROUND

In a computer network, data is transmitted from a source to a destination in the form of packets that generally pass through one or more network devices (e.g., switches, routers, firewalls, etc.). Packet-switched networks can experience rapid bursts of data packets (i.e. microburst) sent in quick succession. Microbursts can lead to network problems such as overflowing packet buffers in network endpoints, routers, switches, etc. Microbursts can be very problematic in that they can lead to lost packets that do not get to their destination through the network and can cause a major impact on applications.

Monitoring of a buffer in a network device is useful to gain knowledge for network administration, analysis, and performance. Network administrators benefit from analyzing when and how microbursts occur with a network by allowing the administrators to better design the networks, allocate resources, etc. Software-based mechanisms have been employed to monitor packet counters to determine when microbursts occur. However, known software solutions are limited by their ability to detect very fine grain bursts in envelopes smaller than milliseconds. Additionally a network administrator needs to have advanced know-how to configure the software packages as well as to interpret the data. Furthermore, known hardware solutions merely record the data and the network administrators are required to interpret whether the data was indicative of a burst

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
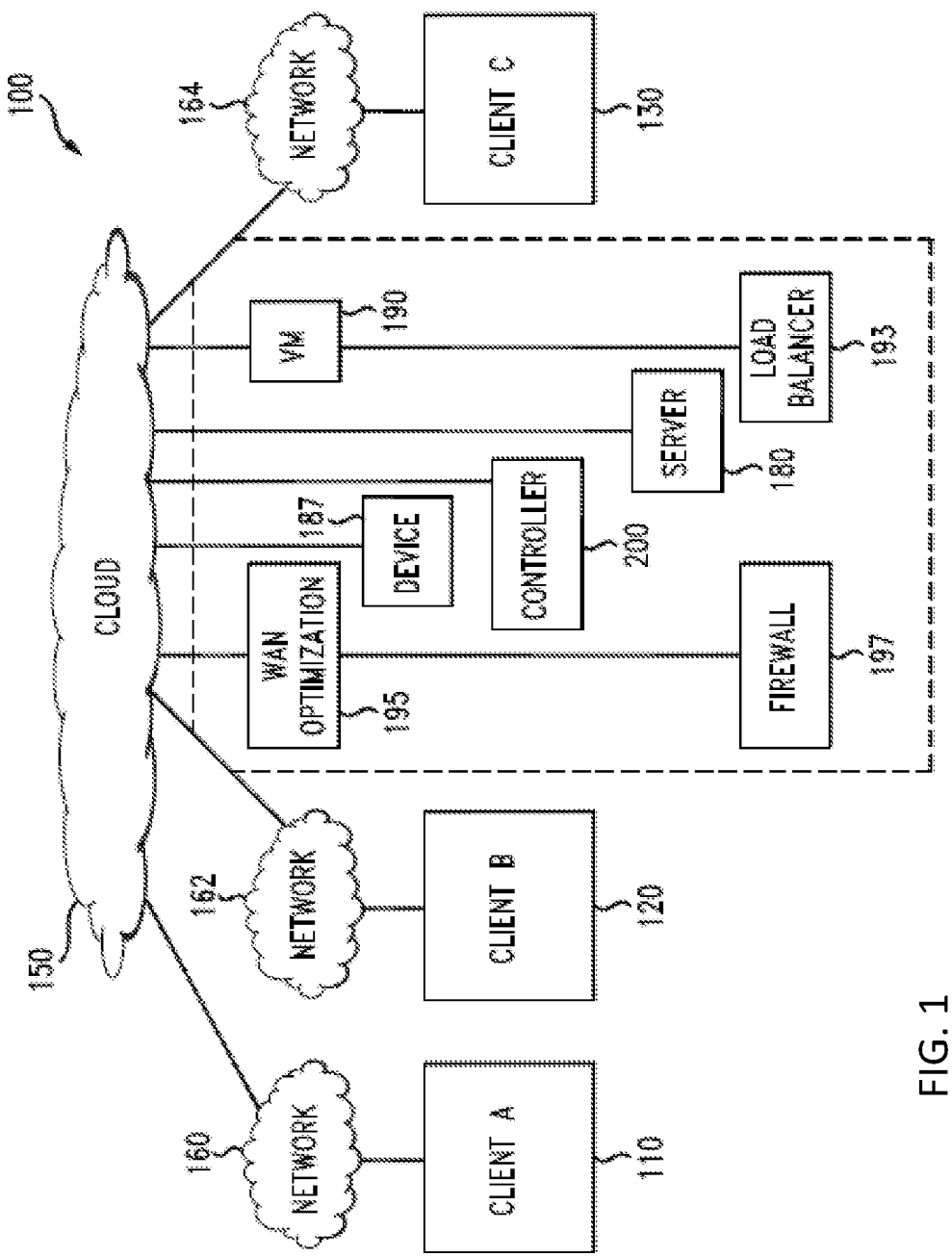
FIG. 1 illustrates a schematic block diagram of an example cloud architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to detect and analyze microbursts. Disclosed are systems, methods, and computer-readable storage media for monitoring queue occupancy in a network buffer, detecting microbursts, and analyzing the same. In some cases, the present technology involves an ASIC device monitoring a queue occupancy value of a network buffer and detecting when the queue occupancy value exceeds a first predetermined threshold queue occupancy. After detecting that the queue occupancy exceeds the threshold, the device can create a record with a time that the queue occupancy value exceeds the first predetermined threshold queue occupancy. Additionally, the device can include the queue occupancy value at the time that the queue occupancy value exceeds the first predetermined threshold queue occupancy in the record.

In some cases, the present technology further involves detecting when the queue occupancy value falls below a second predetermined threshold queue occupancy and determining a maximum queue occupancy value between the time that the queue occupancy value exceeded the first predetermined threshold queue occupancy and a time that the queue occupancy value falls below the second predetermined threshold queue occupancy. Next, the maximum queue occupancy value, a time of the maximum queue occupancy value, and the time that the queue that the queue occupancy value falls below the second predetermined threshold queue occupancy can be added to the record and send to an analytics device. Additionally, the device can include the queue occupancy value at the time that the queue occupancy value falls beneath the second predetermined threshold queue occupancy in the record. Also, in some cases, the device creates separate records for each event including the time that the queue occupancy value exceeds the first predetermined threshold queue occupancy in the record, the maximum queue occupancy, and the time that the queue occupancy value falls beneath the second predetermined threshold queue occupancy in the record.

In some cases, the second predetermined threshold queue occupancy is less than the first predetermined threshold queue occupancy value by a maximum transmission unit of a network.

In some cases, the technology can further involve detecting, before detecting when the queue occupancy value falls below the second predetermined threshold queue occupancy, the expiration of a timer. Upon the expiration of the time, the burst analyzer can determine a local maximum queue occupancy value between the time that the queue occupancy value exceeded the first predetermined threshold queue occupancy and a time when the timer expired and create a periodic record with the time that the queue occupancy value exceeded the first predetermined threshold queue occupancy, the maximum queue occupancy value, a time of the maximum queue occupancy value, and the time that the timer expired.

In some cases, the technology can involve receiving, from a network device, an instruction effective to program one or more of the first predetermined threshold queue occupancy, second predetermined threshold queue occupancy, and a duration of the timer.

Description

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (Aps), which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN or secure shell (SSH) tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Networks can include various hardware or software appliances or nodes to support data communications, security, and provision services. For example, networks can include routers, hubs, switches, APs, firewalls, repeaters, intrusion detectors, servers, VMs, load balancers, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load balancing for flows associated with specific appliances or nodes. A flow can include packets that have the same source and destination information. Thus, packets originating from device A to service node B can all be part of the same flow.

Endpoint groups (EPGs) can also be used in a network for mapping applications to the network. In particular, EPGs can use a grouping of application endpoints in a network to apply connectivity and policy to the group of applications. EPGs can act as a container for groups or collections of applications, or application components, and tiers for implementing forwarding and policy logic. EPGs also allow separation of network policy, security, and forwarding from addressing by instead using logical application boundaries.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

The cloud may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. In some cases, the cloud can be include one or more cloud controllers which can help manage and interconnect various elements in the cloud as well as tenants or clients connected to the cloud.

Cloud controllers and/or other cloud devices can be configured for cloud management. These devices can be pre-configured (i.e., come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

Networks typically employ security features such as network access control to prevent unauthorized access to a network and to allow a network to provide multiple levels of access to network resources. In some cases, port-based Network Access Control (PNAC), such as IEEE 802.1x, is used to authorize devices attempting to connect to a LAN or WLAN. PNAC technology typically involves a network administrator configuring network devices with security material (e.g. mutual authentication keys) and using an authentication server to verify the security material when a supplicant device requests access to the network. However, typical PNAC solutions that require an administrator to program device credentials on a device and server are burdensome, require advanced knowledge of network operations, presents opportunity for human error. Furthermore, typical PNAC security material (e.g. 802.1x certificates) is burdensome to revoke. Also, for wireless access points, an administrator needs to access the network controller to obtain configuration credentials and authenticate with the authentication server, thereby requiring the administrator to disable port security which can result in the human administrator to forget to re-enable security at the switch—which can result in a completely unsecure network access point.

Figure 2:
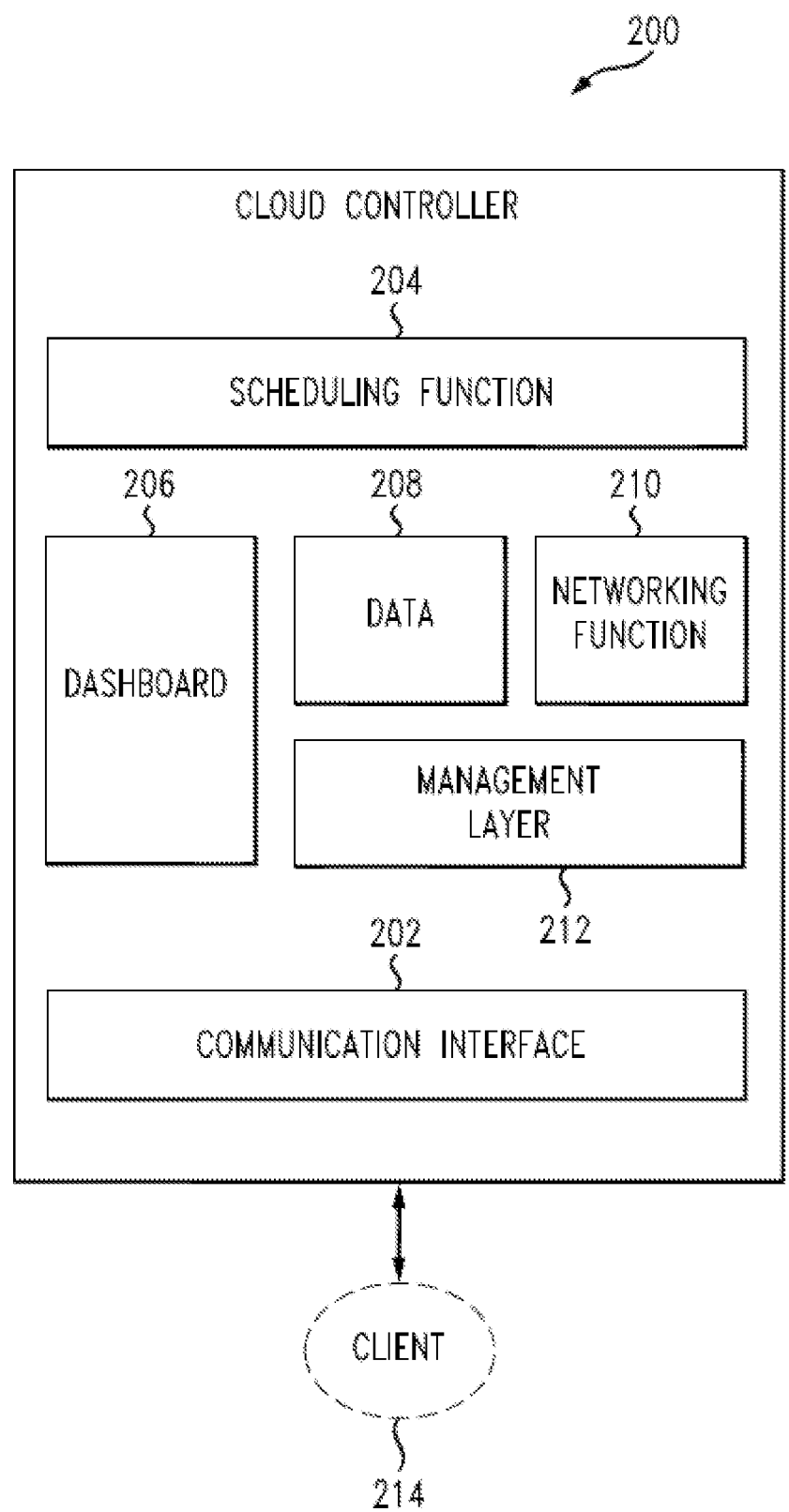
FIG. 2 illustrates a schematic block diagram of an example cloud controller.
Figure 6:
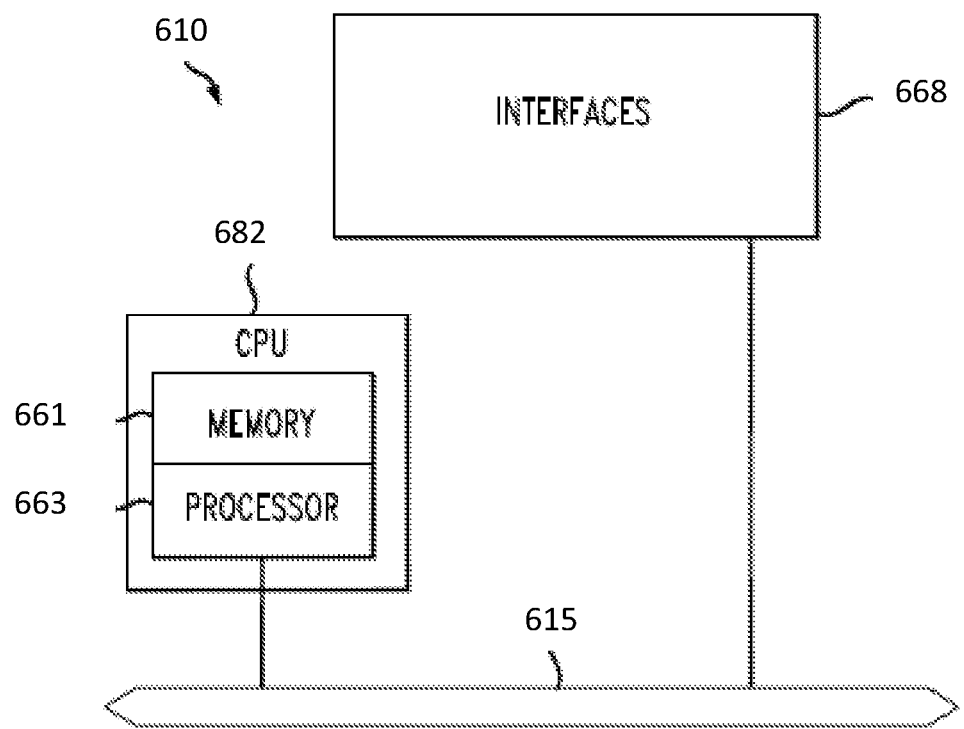
FIG. 6 illustrates an example network device 610 suitable for implementing monitoring and detecting microbursts.
Figure 7A:
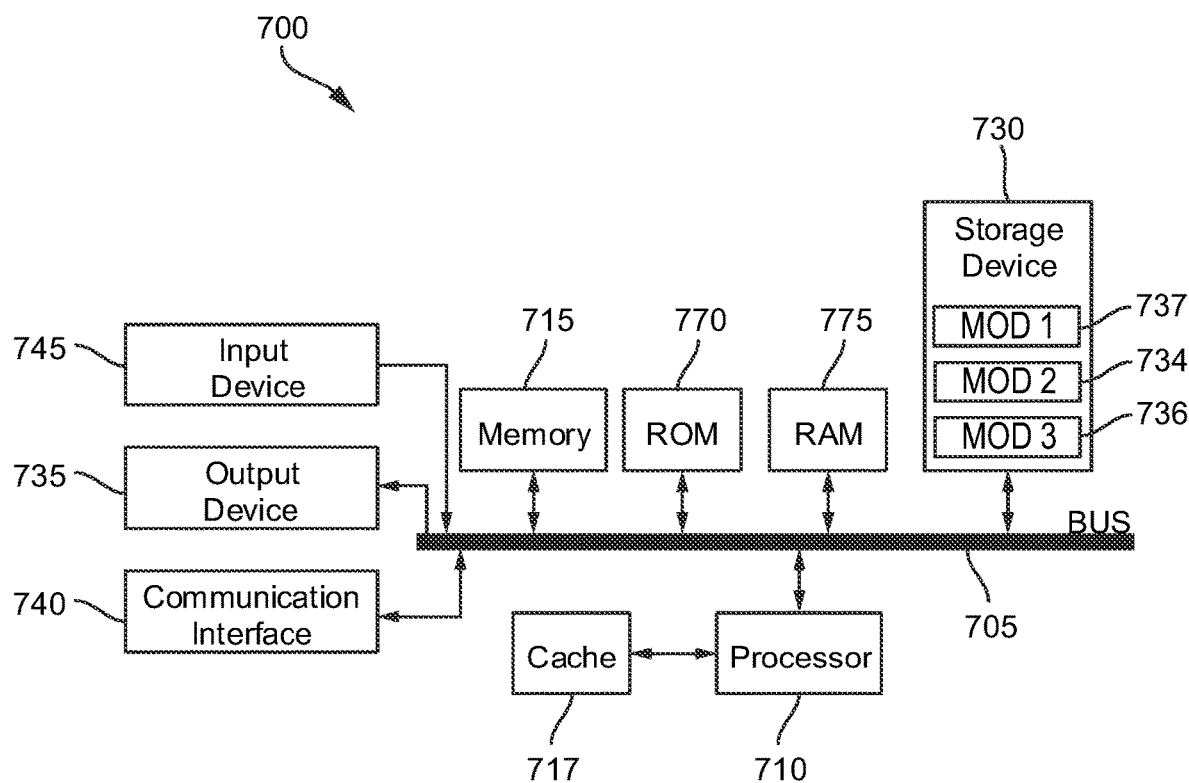
FIG. 7A and FIG. 7B illustrate example system embodiments.
Figure 7B:
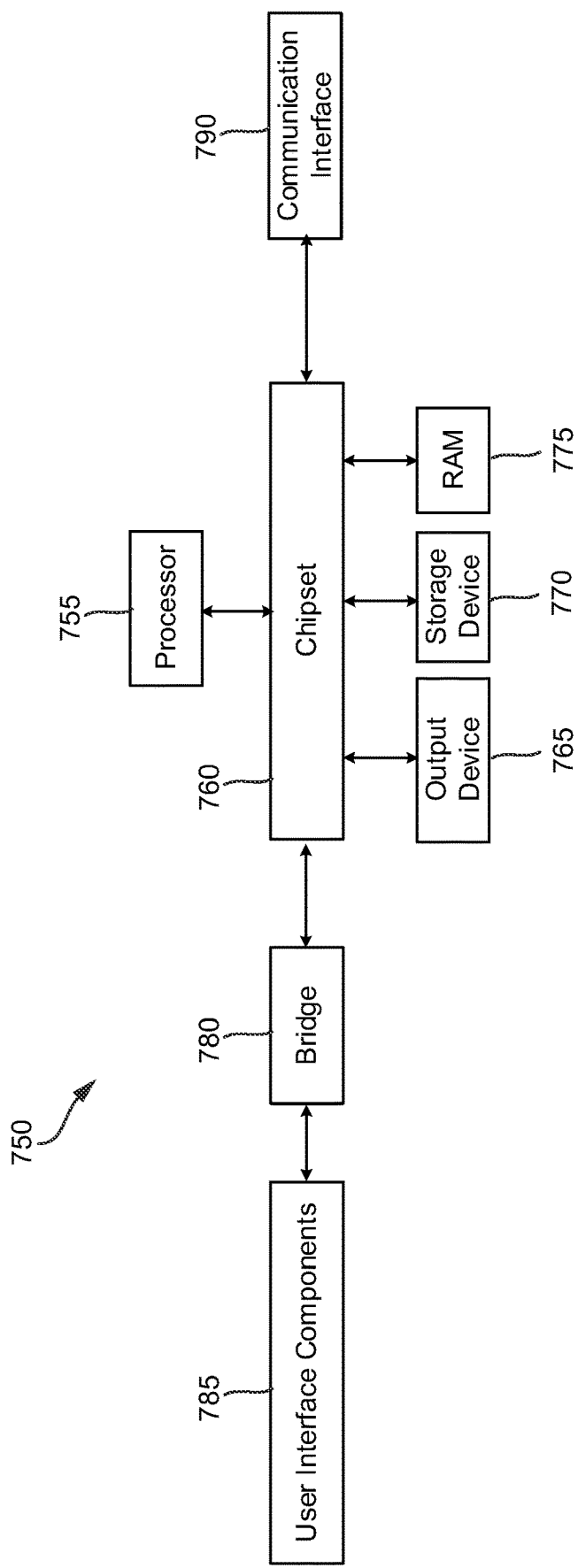

The disclosed technology addresses the need in the art for improved network security. Disclosed are systems, methods, and computer-readable storage media for microburst detection and analysis. A description of cloud computing environments, as illustrated in FIGS. 1 and 2, is first disclosed herein. A discussion of detection and analysis of microbursts and, including examples and variations, as illustrated in FIGS. 3-5B, will then follow. The discussion then concludes with a brief description of example devices, as illustrated in FIGS. 6 and 7A-B. These variations shall be described herein as the various embodiments are set forth. The disclosure now turns to FIG. 1.

FIG. 1 illustrates a schematic block diagram of an example cloud architecture 100 including nodes/devices interconnected by various methods of communication. Cloud 150 can be a public, private, and/or hybrid cloud system. Cloud 150 can include resources, such as one or more Firewalls 197; Load Balancers 193; WAN optimization platforms 195; devices 187, such as switches, routers, intrusion detection systems, Auto VPN systems, or any hardware or software network device; servers 180, such as dynamic host configuration protocol (DHCP), domain naming system (DNS), or storage servers; virtual machines (VMs) 190; controllers 200, such as a cloud controller or a management device; or any other resource.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, the cloud 150 can provision application services, storage services, management services, monitoring services, configuration services, administration services, backup services, disaster recovery services, bandwidth or performance services, intrusion detection services, VPN services, or any type of services to any device, server, network, client, or tenant.

In addition, cloud 150 can handle traffic and/or provision services. For example, cloud 150 can provide configuration services, such as auto VPN, automated deployments, automated wireless configurations, automated policy implementations, and so forth. In some cases, the cloud 150 can collect data about a client or network and generate configuration settings for specific service, device, or networking deployments. For example, the cloud 150 can generate security policies, subnetting and routing schemes, forwarding schemes, NAT settings, VPN settings, and/or any other type of configurations. The cloud 150 can then push or transmit the necessary data and settings to specific devices or components to manage a specific implementation or deployment. For example, the cloud 150 can generate VPN settings, such as IP mappings, port number, and security information, and send the VPN settings to specific, relevant device(s) or component(s) identified by the cloud 150 or otherwise designated. The relevant device(s) or component(s) can then use the VPN settings to establish a VPN tunnel according to the settings.

To further illustrate, cloud 150 can provide specific services for client A (110), client B (120), and client C (130).

For example, cloud 150 can deploy a network or specific network components, configure links or devices, automate services or functions, or provide any other services for client A (110), client B (120), and client C (130). Other non-limiting example services by cloud 150 can include network administration services, network monitoring services, content filtering services, application control, WAN optimization, firewall services, gateway services, storage services, protocol configuration services, wireless deployment services, and so forth.

To this end, client A (110), client B (120), and client C (130) can connect with cloud 150 through networks 160, 162, and 164, respectively. More specifically, client A (110), client B (120), and client C (130) can each connect with cloud 150 through networks 160, 162, and 164, respectively, in order to access resources from cloud 150, communicate with cloud 150, or receive any services from cloud 150. Networks 160, 162, and 164 can each refer to a public network, such as the Internet; a private network, such as a LAN; a combination of networks; or any other network, such as a VPN or an overlay network.

Moreover, client A (110), client B (120), and client C (130) can each include one or more networks. For example, (110), client B (120), and client C (130) can each include one or more LANs and VLANs. In some cases, a client can represent one branch network, such as a LAN, or multiple branch networks, such as multiple remote networks. For example, client A (110) can represent a single LAN network or branch, or multiple branches or networks, such as a branch building or office network in Los Angeles and another branch building or office network in New York. If a client includes multiple branches or networks, the multiple branches or networks can each have a designated connection to the cloud 150. For example, each branch or network can maintain a tunnel to the cloud 150. Alternatively, all branches or networks for a specific client can connect to the cloud 150 via one or more specific branches or networks. For example, traffic for the different branches or networks of a client can be routed through one or more specific branches or networks. Further, client A (110), client B (120), and client C (130) can each include one or more routers, switches, appliances, client devices, VMs, or any other devices. In some cases, client A (110), client B (120), and/or client C (130) can also maintain links between branches. For example, client A can have two branches, and the branches can maintain a link between each other.

In some cases, branches can maintain a tunnel between each other, such as a VPN tunnel. Moreover, the link or tunnel between branches can be generated and/or maintained by the cloud 150. For example, the cloud 150 can collect network and address settings for each branch and use those settings to establish a tunnel between branches. In some cases, the branches can use a respective tunnel between the respective branch and the cloud 150 to establish the tunnel between branches. For example, branch 1 can communicate with cloud 150 through a tunnel between branch 1 and cloud 150 to obtain the settings for establishing a tunnel between branch 1 and branch 2. Branch 2 can similarly communicate with cloud 150 through a tunnel between branch 2 and cloud 150 to obtain the settings for the tunnel between branch 1 and branch 2.

In some cases, cloud 150 can maintain information about each client network, in order to provide or support specific services for each client, such as monitoring and tracking microbursts as further described below in FIGS. 3-5. Cloud 150 can also maintain one or more links or tunnels to client A (110), client B (120), and client C (130). For example, cloud 150 can maintain a VPN tunnel to one or more devices in client A's network. In some cases, cloud 150 can configure the VPN tunnel for a client, maintain the VPN tunnel, or automatically update or establish any link or tunnel to the client or any devices of the client.

The cloud 150 can also monitor device and network health and status information for client A (110), client B (120), and client C (130). To this end, client A (110), client B (120), and client C (130) can synchronize information with cloud 150. Cloud 150 can also manage and deploy services for client A (110), client B (120), and client C (130). For example, cloud 150 can collect network information about client A and generate network and device settings to automatically deploy a service for client A. In addition, cloud 150 can update device, network, and service settings for client A (110), client B (120), and client C (130). For example, cloud 150 can include a burst analyzer to monitor and measure microbursts as further described below.

Those skilled in the art will understand that the cloud architecture 150 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 150 can include any number or type of resources, which can be accessed and utilized by clients or tenants. The illustration and examples provided herein are for clarity and simplicity.

Moreover, as far as communications within the cloud architecture 100, packets (e.g., traffic and/or messages) can be exchanged among the various nodes and networks in the cloud architecture 100 using specific network communication protocols. In particular, packets can be exchanged using wired protocols, wireless protocols, or any other protocols. Some non-limiting examples of protocols can include protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. For example, switches, hubs, routers, access points (APs), antennas, network interface cards (NICs), modules, cables, firewalls, servers, repeaters, sensors, etc.

FIG. 2 illustrates a schematic block diagram of an example cloud controller 200. The cloud controller 200 can serve as a cloud service management system for the cloud 150. In particular, the cloud controller 200 can manage cloud operations, client communications, service provisioning, network configuration and monitoring, etc. For example, the cloud controller 200 can manage cloud service provisioning, such as cloud storage, media, streaming, security, or administration services. In some embodiments, the cloud controller 200 can manage negotiating an exchange of security material between a network and connecting devices as further described in FIG. 3, below.

For example, the cloud controller 200 can receive access requests from an access point connected to the network through a switch port via a secure tunnel, determine that the access point is trusted, and negotiate security material with the access point without requiring manual configuration, and instruct the switch port to adopt a trusted PNAC policy for the trusted access point.

The cloud controller 200 can include several subcomponents, such as a scheduling function 204, a dashboard 206, data 208, a networking function 210, a management layer 212, and a communications interface 202. The various subcomponents can be implemented as hardware and/or software components. Moreover, although FIG. 2 illustrates one example configuration of the various components of the cloud controller 200, those of skill in the art will understand that the components can be configured in a number of different ways and can include any other type and number of components. For example, the networking function 210 and management layer 212 can belong to one software module or multiple separate modules. Other modules can be combined or further divided up into more subcomponents.

The scheduling function 204 can manage scheduling of procedures, events, or communications. For example, the scheduling function 204 can schedule when resources should be allocated from the cloud 150. As another example, the scheduling function 204 can schedule when specific instructions or commands should be transmitted to the client 214. In some cases, the scheduling function 204 can provide scheduling for operations performed or executed by the various subcomponents of the cloud controller 200. The scheduling function 204 can also schedule resource slots, virtual machines, bandwidth, device activity, status changes, nodes, updates, etc.

The dashboard 206 can provide a frontend where clients can access or consume cloud services. For example, the dashboard 206 can provide a web-based frontend where clients can configure client devices or networks that are cloud-managed, provide client preferences, specify policies, enter data, upload statistics, configure interactions or operations, etc. In some cases, the dashboard 206 can provide visibility information, such as views of client networks or devices. For example, the dashboard 206 can provide a view of the status or conditions of the client's network, the operations taking place, services, performance, a topology or layout, specific network devices, protocols implemented, running processes, errors, notifications, alerts, network structure, ongoing communications, data analysis, etc.

Indeed, the dashboard 206 can provide a graphical user interface (GUI) for the client 214 to monitor the client network, the devices, statistics, errors, notifications, etc., and even make modifications or setting changes through the GUI. The GUI can depict charts, lists, tables, maps, topologies, symbols, structures, or any graphical object or element. In addition, the GUI can use color, font, shapes, or any other characteristics to depict scores, alerts, or conditions. In some cases, the dashboard 206 can also handle user or client requests. For example, the client 214 can enter a service request through the dashboard 206.

The data 208 can include any data or information, such as management data, statistics, settings, preferences, profile data, logs, notifications, attributes, configuration parameters, client information, network information, and so forth. For example, the cloud controller 200 can collect network statistics from the client 214 and store the statistics as part of the data 208. In some cases, the data 208 can include performance and/or configuration information. This way, the cloud controller 200 can use the data 208 to perform management or service operations for the client 214. The data 208 can be stored on a storage or memory device on the cloud controller 200, a separate storage device connected to the cloud controller 200, or a remote storage device in communication with the cloud controller 200.

The networking function 210 can perform networking calculations, such as network addressing, or networking service or operations, such as auto VPN configuration or traffic routing. For example, the networking function 210 can perform filtering functions, switching functions, microburst detection functions, network or device deployment functions, resource allocation functions, messaging functions, traffic analysis functions, port configuration functions, mapping functions, packet manipulation functions, path calculation functions, loop detection, cost calculation, error detection, or otherwise manipulate data or networking devices. In some embodiments, the networking function 210 can handle networking requests from other networks or devices and establish links between devices. In other embodiments, the networking function 210 can perform queuing, messaging, or protocol operations.

The management layer 212 can include logic to perform management operations. For example, the management layer 212 can include the logic to allow the various components of the cloud controller 200 to interface and work together. The management layer 212 can also include the logic, functions, software, and procedure to allow the cloud controller 200 perform monitoring, management, control, and administration operations of other devices, the cloud 150, the client 214, applications in the cloud 150, services provided to the client 214, or any other component or procedure. The management layer 212 can include the logic to operate the cloud controller 200 and perform particular services configured on the cloud controller 200.

Moreover, the management layer 212 can initiate, enable, or launch other instances in the cloud controller 200 and/or the cloud 150. In some embodiments, the management layer 212 can also provide authentication and security services for the cloud 150, the client 214, the controller 214, and/or any other device or component. Further, the management layer 212 can manage nodes, resources, VMs, settings, policies, protocols, communications, etc. In some embodiments, the management layer 212 and the networking function 210 can be part of the same module. However, in other embodiments, the management layer 212 and networking function 210 can be separate layers and/or modules. The communications interface 202 allows the cloud controller 200 to communicate with the client 214, as well as any other device or network. The communications interface 202 can be a network interface card (NIC), and can include wired and/or wireless capabilities. The communications interface 202 allows the cloud controller 200 to send and receive data from other devices and networks.

As explained above, known systems for monitoring and analyzing microbursts is very useful. However, known solutions are unable to detect bursts in a small enough time scale, e.g. nanosecond granularity. The present technology involves improved ability to monitor and analyze microbursts.

Figure 3:
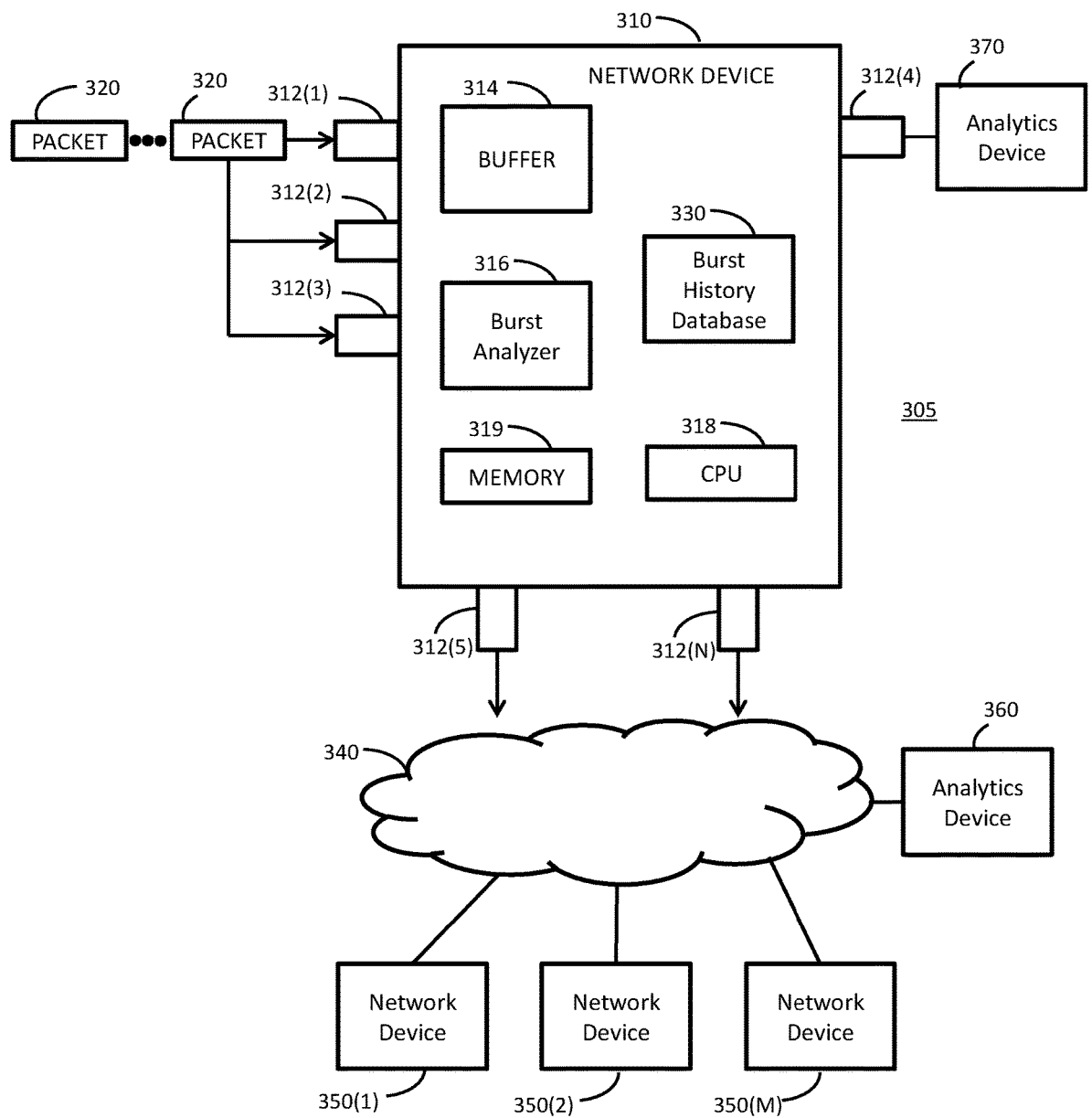
FIG. 3 illustrates a network environment with a network device configured to monitor and analyze packet bursts based on occupancy of a buffer the network device.

Referring now to FIG. 3, a network environment 305 includes a network device 310 configured to monitor and analyze packet bursts based on occupancy of a buffer the network device 310. The network device 310 can be any network device now known or hereinafter developed, including a switch, router, gateway, a software stack on a host device, virtual network interface cards (VNICs) virtual switches, physical network interface cards (including those that support virtualization).

The network device 310 comprises a plurality of ports 312(1)-312(N), any of which can serve as an ingress port or egress port at any time. The network device includes a buffer 314, a burst analyzer 316, a central processing unit (CPU) 318 and memory 319. The burst analyzer 16 can be configured as an Application Specific Integrated Circuit (ASIC) in the network device 310, as an independent external ASIC, on a network controller, in the switch fabric, etc.

In FIG. 3, only one buffer 314 is shown for simplicity; however, there can be numerous buffers in the network device 310 and the techniques presented herein are useful for each of a plurality of buffers in a network device.

Packets 320 arrive at the network device 310 via any of the ports 312(1)-312(N). FIG. 3 shows an example where packets are arriving at ports 312(1), 312(2) and 312(3). The network device 310 is coupled to a network 340, e.g., a local area network or wide area network (the Internet), via ports 312(5)-312(N) to ultimately communicate with any one or more of the network devices 350(1)-350(M).

Generally, the burst analyzer 316 captures information describing occupancy of the buffer 314 caused by packet flow through the buffer in the network device 310 and stores burst analytics in a burst history database 330. Also, the network device 310 can also send burst analytics to one or more local device 370, analytics device 360 connected to the network 340, etc.

The burst analyzer 316 can monitor all the queues in all the ports 312(1)-312(N) in the networking device 310 and track micro-bursts using queue occupancy at nano-second granularity. In some cases, the burst analyzer 316 can monitor and track queue occupancy for thousands of queues per ASIC.

The burst analyzer 316 can also determine when queue occupancy exceeds and/or falls below programmed thresholds, a number of parameters are tracked to describe the micro-burst. For example, the burst analyzer 316 can track the time when the burst started, the peak occupancy during the tracking period, the time when the peak occurred, and the time when the burst ended based on a programmable threshold or a time-limit. Also, as explained in greater detail below, if the burst analyzer 316 detects that a burst does not end within a burst tracking time period, the burst analyzer 316 can track one or more local peaks along with the time when they occurred.

By measuring the bursts in an ASIC, measurement can be performed at a high resolution (e.g. nano-seconds) allowing measurement of even the smallest burst while keeping track of the accurate time of the event using a timestamp (e.g. Precision Time Protocol (PTP) timestamp.

Figure 4:
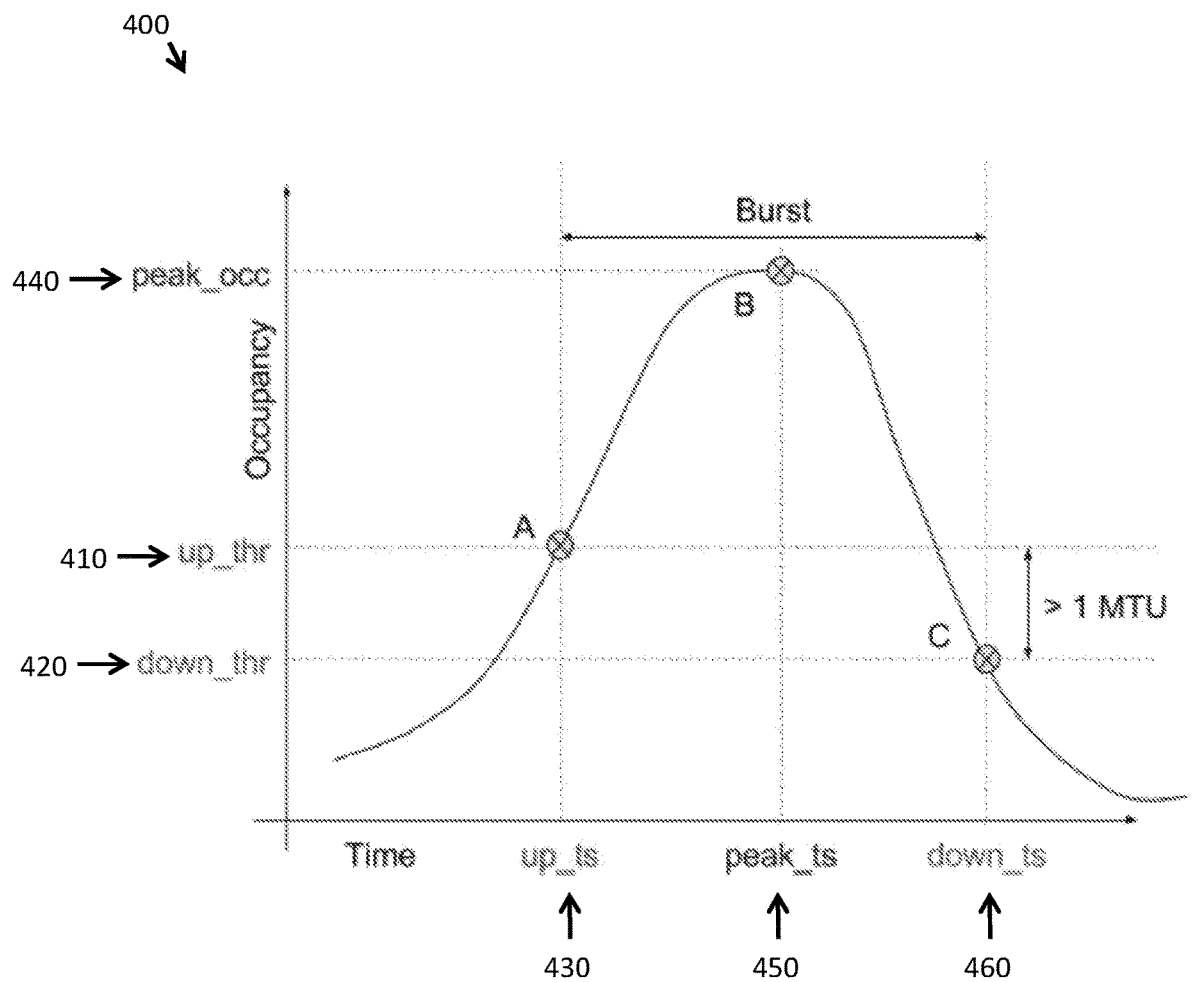
FIG. 4 illustrates an example diagram of queue occupancy over time and a variety of parameters that can be monitored and analyzed.

FIG. 4 illustrates an example diagram 400 of queue occupancy over time and a variety of parameters that can be monitored and analyzed. In some cases, the burst analyzer (e.g. running on an ASIC) can be programed to identify two occupancy thresholds that serve as parameters for purpose of defining and recording a burst. For example, the burst analyzer can be programed to identify an UP-threshold and a DOWN-threshold. In some cases, the UP-threshold and a DOWN-threshold are re-programmable and can be re-programmed manually by an administrator, automatically based on a feedback loop, etc.

When queue occupancy crosses the UP-threshold 410, a timestamp can be created and the time 430 that the occupancy crossed the UP-threshold is noted in the record. The queue occupancy is then tracked through its peak occupancy value 440 until the queue occupancy falls below the DOWN-threshold 420.

At the point that the queue occupancy falls below the DOWN-threshold 420, the record can include:

1) The time 430 that the occupancy crossed the UP-threshold;
2) The peak occupancy value 440;
3) The time 450 of the peak occupancy; and
4) The time 460 that the occupancy crossed the DOWN-threshold.

The record is provided as a FIFO from the networking device. For example, the records are enqueued into the FIFO by the device and dequeued by software. Also, the processing of these records can be immediate (e.g. for on-line detection of incast bursts) or post-processed to diagnose, detect, and isolate the source of issues in the network. A analytics device or other networking agent (either locally attached to the device/ASIC or a remote collector) can gather the burst records from one device or multiple devices across the network to diagnose location, duration, and source of these incast bursts. This provides much more granular and fine-grain information about incasts and microbursts than possible through SNMP or other software based statistics.

In some cases, all of the queue occupancies in a network are tracked in parallel for all unicast and multicast queues in parallel and the UP-threshold can be greater than the DOWN-threshold to achieve a hysteresis. Also, in some cases, the UP-threshold and DOWN threshold be separated by at least one maximum transmission unit (MTU). Also, in some cases, the UP-threshold and the DOWN-threshold can be programmable.

In some cases, the MTU-size separation allows a clear occupancy peak to be observed. Also, this separation can avoid instantaneous errors for multi-cell packets (multi-cell packets are accounted as MTU at start-of-frame and the packet size is corrected at end-of-frame because of cut-through packet flow).

Figure 5A:
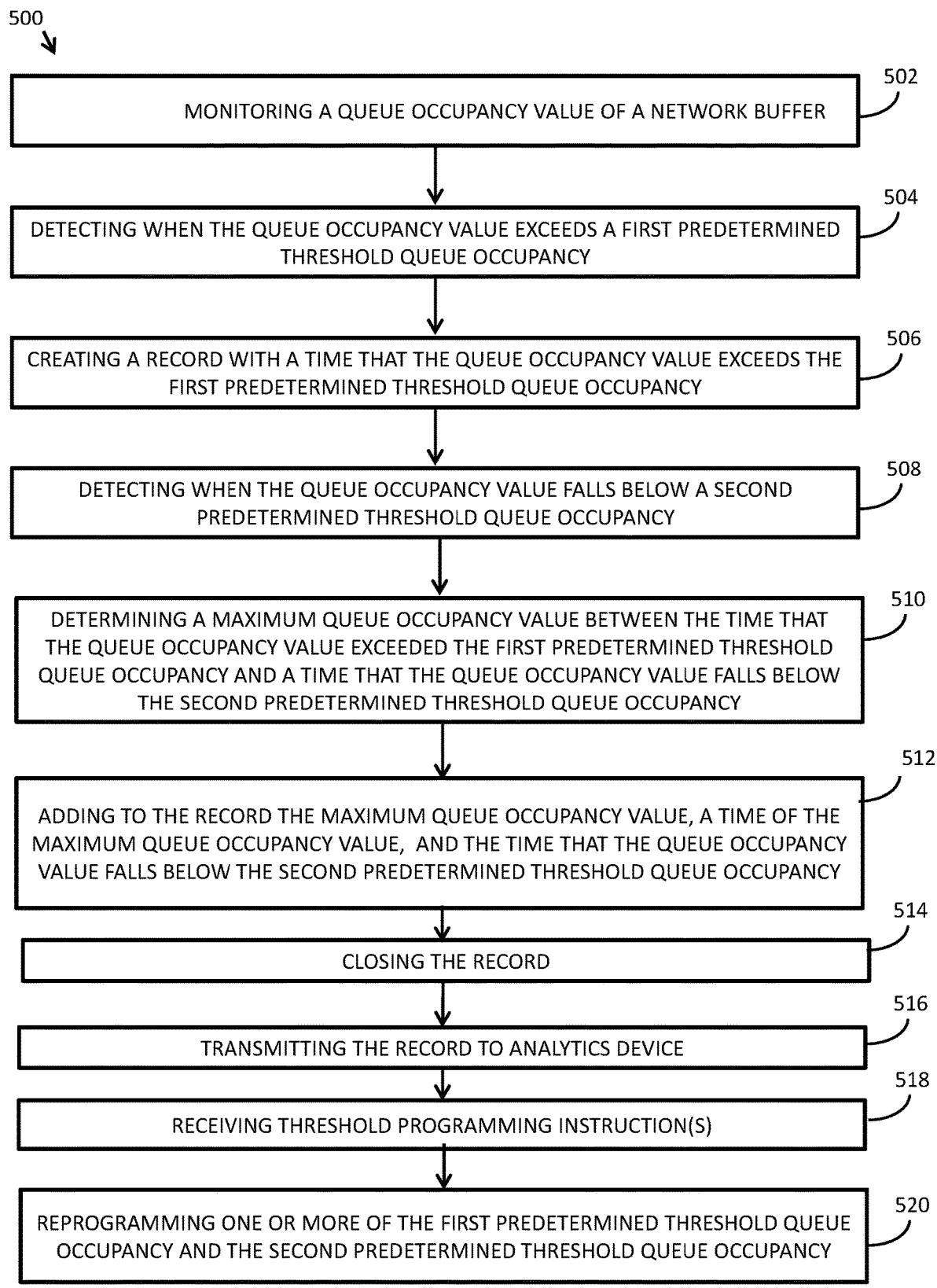
FIG. 5A illustrates an example method of monitoring and analyzing a microburst.

FIG. 5A illustrates an example method 500 of monitoring and analyzing a microburst. In some cases, the method 500 is performed on an ASIC communicatively coupled with a network device. The method 500 can involve monitoring a queue occupancy value of a network buffer 502 and detecting when the queue occupancy value exceeds a first predetermined threshold queue occupancy 504. The detection of the first threshold occupancy value can indicate the beginning of a microburst and the method 500 can involve creating a record with a time that the queue occupancy value exceeds the first predetermined threshold queue occupancy 506. Next, the method 500 involves detecting when the queue occupancy value falls below a second predetermined threshold queue occupancy 508 and determining a maximum queue occupancy value between the time that the queue occupancy value exceeded the first predetermined threshold queue occupancy and a time that the queue occupancy value falls below the second predetermined threshold queue occupancy 510.

After determining the maximum queue occupancy between the threshold events, the method 500 can include adding to the record the maximum queue occupancy value, a time of the maximum queue occupancy value, and the time that the queue occupancy value falls below the second predetermined threshold queue occupancy 512, closing the record 514, and transmitting the record to an analytics device 516. In some cases, the record is provided as a FIFO from the networking device. The records can be enqueued into the FIFO by the device and dequeued by software. The processing of these records can be immediate (for on-line detection of incast bursts) or post-processed to diagnose, detect, and isolate the source of issues in the network.

The analytics device can also correlate the record with one or more other network activities, e.g. the execution of a specific application. Also, in some cases, the first predetermined threshold queue occupancy, the second predetermined threshold queue occupancy, or both are programmable. For example, an analytics device can prepare instructions for programming the threshold levels. Accordingly, the method 500 can also involve receiving threshold programming instructions 518 and reprogramming one or more of the first predetermined threshold queue occupancy and the second predetermined threshold queue occupancy 520.

Figure 5B:
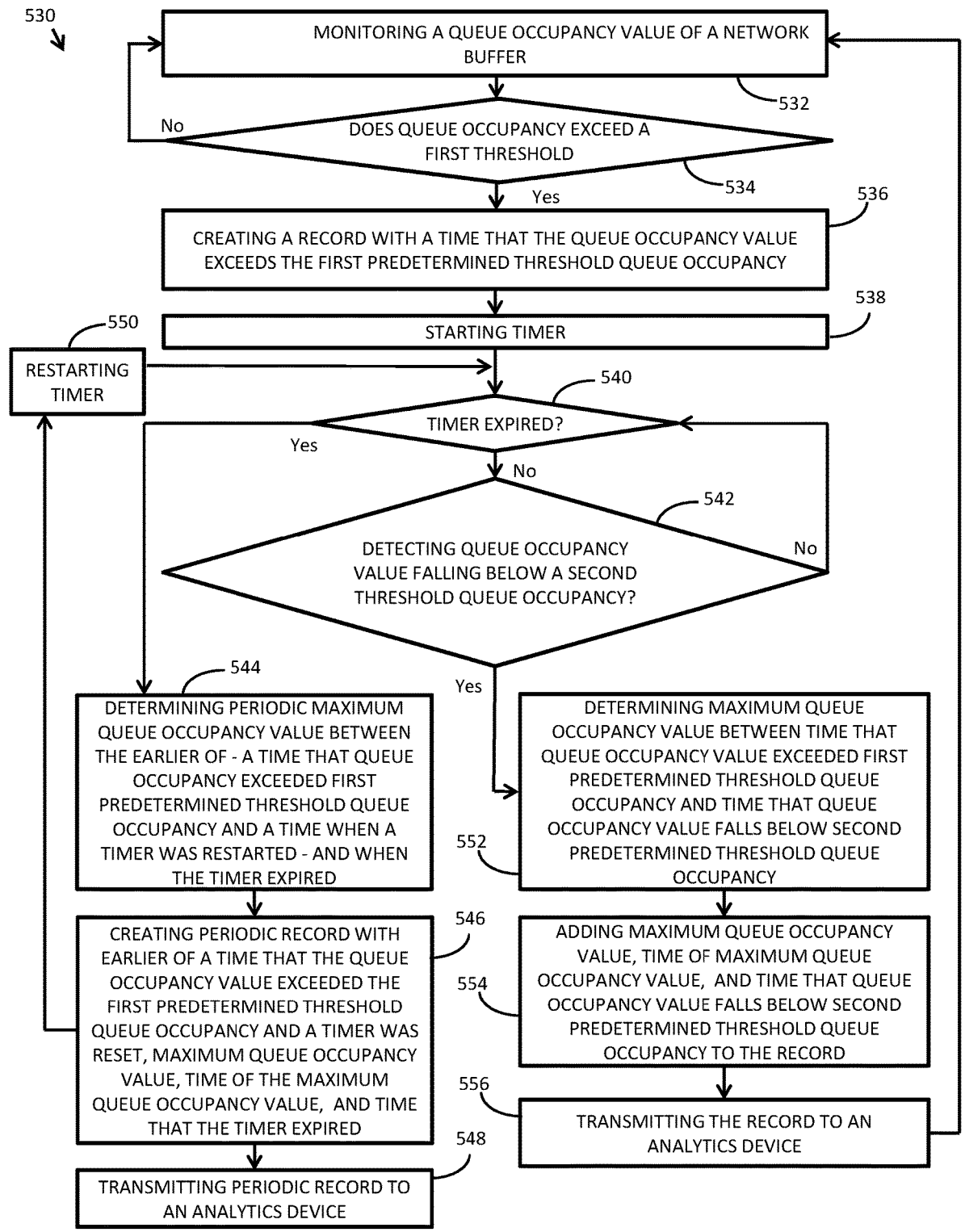
FIG. 5B illustrates a method of performing a periodic queue tracking feature.

In addition to detecting short bursts with temporally proximate UP-threshold and DOWN-threshold occupancy values, some embodiments of the present technology provide a mechanism to create periodic records for long lasting bursts. These can be used to detect multiple "local maxima" in addition to the "global maxima" for long lasting bursts. As mentioned above, a burst analyzer can track one or more local peaks along with the time when they occurred when the burst analyzer detects that a burst does not end within a burst tracking time period, FIG. 5B illustrates a method 530 of performing periodic tracking of queue. The method 530 involves detecting one or more local maxima and global maxima for a burst in queue occupancy. The method 530 involves monitoring a queue occupancy value of a network buffer 532 and determining when queue occupancy exceeds a first predetermined occupancy threshold 534.

When a queue occupancy does not exceed a first predetermined occupancy threshold 534, the method 530 continues to monitor the queue occupancy. However, when a queue occupancy exceeds the first predetermined occupancy threshold, the method 530 involves creating a record with a time that the queue occupancy value exceeds the first predetermined threshold queue occupancy 536.

In some cases, distinguishing "short" bursts from "long lasting" bursts involves defining in a time envelope and using a timer. Therefore, the method 530 can involve starting a timer 538 after detecting the queue occupancy exceeding the first predetermined occupancy threshold and determining whether the timer has expired 540.

When a timer has not expired, the method 530 involves detecting whether the queue occupancy value falls under a second predetermined threshold queue occupancy 542. Until the queue occupancy value falls under a second predetermined threshold queue occupancy or the timer expires, the step of detecting whether the queue occupancy value falls under a second predetermined threshold queue occupancy 542 iterates.

When the timer expires before detecting that the queue occupancy value falls under a second predetermined threshold queue occupancy, the method 530 involves determining a local maximum queue occupancy value between the earlier of time that the queue occupancy exceeded the first predetermined threshold queue occupancy and a time when a timer is restarted (explained below) and the time when the timer expired 544. In some cases, a device can also initiate a local maximum queue occupancy value record independently of the queue occupancy exceeding a threshold by starting a timer. For example, a schedule of local maximum queue occupancy values can be programmed by scheduling timer starts.

The method 530 also involves creating a periodic record with time that the queue occupancy value exceeded the first predetermined threshold queue occupancy (or when a timer starts or restarts), the maximum queue occupancy value, the time of the maximum queue occupancy value, and the time that the timer expired 546 and transmitting the periodic record to an analytics device 548. Also, after creating the periodic record, the method 530 involves restarting the time 550 to detect another local maximum if the second predetermined threshold queue occupancy is not detected or to detect a global maximum is the second predetermined threshold queue occupancy is detected.

When the queue occupancy value falling under a second predetermined threshold queue occupancy is detected before the timer expires, the method 530 involves determining a maximum queue occupancy value between the time that queue occupancy value exceeded the first predetermined threshold queue occupancy and the time that the queue occupancy value falls below the second predetermined threshold queue occupancy 552. Also, the method 530 involves adding the maximum queue occupancy value, the time of maximum queue occupancy value, and the time that queue occupancy value falls below the second predetermined threshold queue occupancy to the record 554, transmitting the record to an analytics device 556, and continuing to monitor the queue occupancy 532. In some cases, the queue occupancy value for the queue occupancy at the time the second predetermined threshold was crossed can also be added to the record.

In some cases, the timer is programmable and can be set depending on the number of active queues served by the burst analyzer. Also, the burst analyzer, the analytics device, or both can interpret burst records and determine one or more queues that are congested and one or more queues that are not congested. In these cases, the burst analyzer can re-program the timer, the thresholds, or both the timer and the thresholds to focus on the congested queues only to allow the congested queues to be analyzed with a more granularity. For example, in some cases, the analytic device can detect that too many or too few (based on a predetermined default number) records are being created and that the thresholds need to be adjusted. Also, the analytic device can enforce a feedback loop for automatically adjusting the thresholds and/or timer to detect when there are too many records created, too few records created, one or more selected queue needs to be analyzed at a finer granularity, etc.

While the various examples above are described in terms of specific devices, such as appliances or branches, one of ordinary skill in the art will readily recognize that the concepts described herein can apply to other devices, networks, or environments.

FIG. 6 illustrates an example network device 610 suitable for implementing monitoring and detecting microbursts. Network device 610 includes a master central processing unit (CPU) 662, interfaces 668, and a bus 615 (e.g., a PCI bus). When acting under the control of appropriate software or firmware, the CPU 662 is responsible for executing packet management, error detection, and/or routing functions. The CPU 662 preferably accomplishes all these functions under the control of software including an operating system and any appropriate applications software. CPU 662 may include one or more processors 663 such as a processor from the Motorola, Intel, AMD, or MIPS family of microprocessors. In an alternative embodiment, processor 663 is specially designed hardware for controlling the operations of router 610. In a specific embodiment, a memory 661 (such as non-volatile RAM and/or ROM) also forms part of CPU 662. However, there are many different ways in which memory could be coupled to the system.

The interfaces 668 are typically provided as interface cards (sometimes referred to as "line cards"). Generally, they control the sending and receiving of data packets over the network and sometimes support other peripherals used with the router 610. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 662 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 661) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 7A and FIG. 7B illustrate example system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 770 and random access memory (RAM) 775, to the processor 710. The system 700 can include a cache of high-speed memory connected directly with, in close proximity to, or integrated as part of the processor 710. The system 700 can copy data from the memory 715 and/or the storage device 730 to the cache 717 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 737, module 7 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 775, read only memory (ROM) 770, and hybrids thereof.

The storage device 730 can include software modules 737, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A computer-implemented method comprising:
monitoring a queue occupancy value of a network buffer;
setting a first predetermined threshold queue occupancy of the network buffer and a second predetermined threshold queue occupancy of the network buffer, wherein the second predetermined threshold queue occupancy is less than the first predetermined threshold queue occupancy by at least one maximum transmission unit of a network from the first predetermined threshold queue occupancy, wherein the first predetermined threshold queue occupancy is configured to trigger a tracking of one or more parameters associated with a microburst, the one or more parameters comprising at least one of a time when the microburst started, a peak occupancy during a tracking period, a time when the microburst ended;
determining a maximum queue occupancy value tracked between a first time that the queue occupancy value exceeded the first predetermined threshold queue occupancy and a second time that the queue occupancy value falls below the second predetermined threshold queue occupancy, wherein the first time that the queue occupancy value exceeded the first predetermined threshold occupancy is before the second time that the queue occupancy value falls below the second predetermined threshold queue occupancy; and
diagnosing one or more characteristics of the microburst based on the maximum queue occupancy value, a third time of the maximum queue occupancy value, and the second time that the queue occupancy value falls below the second predetermined threshold queue occupancy, the one or more characteristics of the microburst comprising at least one of a location, a duration, or a source of the microburst.

2. The computer-implemented method of claim 1, further comprising:
adding, to a record, the queue occupancy value at the first time that the queue occupancy value exceeds the first predetermined threshold queue occupancy and the queue occupancy value at the second time that that the queue occupancy value falls below the second predetermined threshold queue occupancy.

3. The computer-implemented method of claim 1, wherein the one or more parameters associated with the microburst further comprise a time of the peak occupancy.

4. The computer-implemented method of claim 1, wherein the second predetermined threshold queue occupancy is configured to trigger to end the tracking of the one or more parameters associated with the microburst.

5. The computer-implemented method of claim 1, wherein the second predetermined threshold queue occupancy is less than the maximum queue occupancy value.

6. The computer-implemented method of claim 1, further comprising:
detecting, before detecting when the queue occupancy value falls below the second predetermined threshold queue occupancy, expiration of a timer;

determining a local maximum queue occupancy value between earlier of the first time that the queue occupancy value exceeded the first predetermined threshold queue occupancy and a fourth time the timer was re-started and a fifth time when the timer expired; and creating a periodic record with the first time that the queue occupancy value exceeded the first predetermined threshold queue occupancy, the maximum queue occupancy value, the third time of the maximum queue occupancy value, and the fifth time that the timer expired.

7. The computer-implemented method of claim 6, further comprising:

restarting the timer with a same duration upon the expiration of the timer; and creating an additional periodic record with a time that timer was restarted.

8. A system comprising:

one or more processors; and at least one non-transitory computer-readable medium having stored thereon instructions which, when executed by the one or more processors, cause the one or more processors to:

monitor a queue occupancy value of a network buffer;

set a first predetermined threshold queue occupancy of a network buffer and a second predetermined threshold queue occupancy of the network buffer, wherein the second predetermined threshold queue occupancy is less than the first predetermined threshold queue occupancy by at least one maximum transmission unit of a network from the first predetermined threshold queue occupancy, wherein the first predetermined threshold queue occupancy is configured to trigger a tracking of one or more parameters associated with a microburst, the one or more parameters comprising at least one of a time when the microburst started, a peak occupancy during a tracking period, a time when the microburst ended;

determine a maximum queue occupancy value tracked between a first time that the queue occupancy value exceeded the first predetermined threshold queue occupancy and a second time that the queue occupancy value falls below the second predetermined threshold queue occupancy, wherein the first time that the queue occupancy value exceeded the first predetermined threshold occupancy is before the second time that the queue occupancy value falls below the second predetermined threshold queue occupancy; and diagnose one or more characteristics of the microburst based on the maximum queue occupancy value, a third time of the maximum queue occupancy value, and the second time that the queue occupancy value falls below the second predetermined threshold queue occupancy, the one or more characteristics of the microburst comprising at least one of a location, a duration, or a source of the microburst.

9. The system of claim 8, the at least one non-transitory computer-readable medium having stored thereon instructions which, when executed by the one or more processors, cause the one or more processors to:

add, to a record, the queue occupancy value at the first time that the queue occupancy value exceeds the first predetermined threshold queue occupancy and the queue occupancy value at the second time that that the queue occupancy value falls below the second predetermined threshold queue occupancy.

10. The system of claim 8, wherein the one or more parameters further comprise a time of the peak occupancy.

11. The system of claim 8, wherein the second predetermined threshold queue occupancy is configured to trigger an end of the tracking of the one or more parameters.

12. The system of claim 8, wherein the second predetermined threshold queue occupancy is less than the maximum queue occupancy value.

13. The system of claim 8, the at least one non-transitory computer-readable medium having stored thereon instructions which, when executed by the one or more processors, cause the one or more processors to:

detect, before detecting when the queue occupancy value falls below the second predetermined threshold queue occupancy, expiration of a timer;

determine a local maximum queue occupancy value between earlier of the first time that the queue occupancy value exceeded the first predetermined threshold queue occupancy and a fourth time the timer was re-started and a fifth time when the timer expired; and create a periodic record with the first time that the queue occupancy value exceeded the first predetermined threshold queue occupancy, the maximum queue occupancy value, the third time of the maximum queue occupancy value, and the fifth time that the timer expired.

14. The system of claim 13, the at least one non-transitory computer-readable medium having stored thereon instructions which, when executed by the one or more processors, cause the one or more processors to:

restart the timer with a same duration upon the expiration of the timer; and create an additional periodic record with a time that timer was restarted.

15. A non-transitory computer-readable storage media having stored therein instructions which, when executed by one or more processors, cause the one or more processors to:

monitor a queue occupancy value of a network buffer;

set a first predetermined threshold queue occupancy of a network buffer and a second predetermined threshold queue occupancy of the network buffer, wherein the second predetermined threshold queue occupancy is less than the first predetermined threshold queue occupancy by at least one maximum transmission unit of a network from the first predetermined threshold queue occupancy, wherein the first predetermined threshold queue occupancy is configured to trigger a tracking of one or more parameters associated with a microburst, the one or more parameters comprising at least one of a time when the microburst started, a peak occupancy during a tracking period, a time when the microburst ended;

determine a maximum queue occupancy value tracked between a first time that the queue occupancy value exceeded the first predetermined threshold queue occupancy and a second time that the queue occupancy value falls below the second predetermined threshold queue occupancy, wherein the first time that the queue occupancy value exceeded the first predetermined threshold occupancy is before the second time that the queue occupancy value falls below the second predetermined threshold queue occupancy; and diagnose one or more characteristics of the microburst based on the maximum queue occupancy value, a third time of the maximum queue occupancy value, and the second time that the queue occupancy value falls below the second predetermined threshold queue occupancy, the one or more characteristics of the microburst comprising at least one of a location, a duration, or a source of the microburst.

16. The non-transitory computer-readable storage media of claim 15, wherein the instructions, when executed by the one or more processors, cause the one or more processors to:

add, to a record, the queue occupancy value at the first time that the queue occupancy value exceeds the first predetermined threshold queue occupancy and the queue occupancy value at the second time that that the queue occupancy value falls below the second predetermined threshold queue occupancy.

17. The non-transitory computer-readable storage media of claim 15, wherein the one or more parameters associated with the microburst further comprise a time of the peak occupancy.

18. The non-transitory computer-readable storage media of claim 15, wherein the second predetermined threshold queue occupancy is configured to trigger an end of the tracking of the one or more parameters associated with the microburst.

19. The non-transitory computer-readable storage media of claim 15, wherein the second predetermined threshold queue occupancy is less than the maximum queue occupancy value.

20. The non-transitory computer-readable storage media of claim 15, having stored therein instructions which, when executed by the one or more processors, cause the one or more processors to:

detect, before detecting when the queue occupancy value falls below the second predetermined threshold queue occupancy, expiration of a timer;

determine a local maximum queue occupancy value between earlier of the first time that the queue occupancy value exceeded the first predetermined threshold queue occupancy and a fourth time the timer was re-started and a fifth time when the timer expired; and create a periodic record with the first time that the queue occupancy value exceeded the first predetermined threshold queue occupancy, the maximum queue occupancy value, the third time of the maximum queue occupancy value, and the fifth time that the timer expired.

* * * * *